United States Patent
Gottlieb et al.

(10) Patent No.: US 11,481,237 B1
(45) Date of Patent: Oct. 25, 2022

(54) BACKGROUND PROCESSING IN A WEB BROWSER

(71) Applicant: monday.com Ltd., Tel Aviv (IL)

(72) Inventors: Orr Gottlieb, Ramat HaSharon (IL);
Moshe Zemah, Rishon LeZion (IL);
Omer Doron, Tel Aviv (IL)

(73) Assignee: monday.com Ltd., Tei Aviv (IL)

( * ) Notice: Subject to any disclaimer, the term of this patent is extended or adjusted under 35 U.S.C. 154(b) by 0 days.

(21) Appl. No.: 17/565,658

(22) Filed: Dec. 30, 2021

(51) Int. Cl.
*G06F 3/00* (2006.01)
*G06F 9/451* (2018.01)
*G06F 8/38* (2018.01)
*G06F 9/48* (2006.01)

(52) U.S. Cl.
CPC .............. *G06F 9/451* (2018.02); *G06F 8/38* (2013.01); *G06F 9/4881* (2013.01)

(58) Field of Classification Search
CPC ........... G06F 9/451; G06F 8/38; G06F 9/4881
See application file for complete search history.

(56) References Cited

U.S. PATENT DOCUMENTS

2005/0102631 A1* 5/2005 Andreas ............... G06F 3/04847
715/740
2020/0201935 A1* 6/2020 Filipovic ............... G06F 40/154

OTHER PUBLICATIONS

WHATWG "Web Workers", Web Hypertext Application Technology Working Group. WHATWG, Wayback Machine. Chap.10: 1-62, Last Updated Dec. 21, 2021.

* cited by examiner

*Primary Examiner* — Wissam Rashid

(57) ABSTRACT

A system for executing a software program comprises: a display device for displaying a web based GUI of the software program; and a hardware processor adapted for executing in a web browser a code comprising: executing, in a worker thread that is not a primary thread executing code implementing the web based GUI, a client instruction identified in the primary thread for background processing; while the worker thread executes: displaying in a graphical object of the web based GUI data retrieved from a data structure associated with an outcome of executing the client instruction, where the data structure contains temporary data; and modifying another graphical object of the web based GUI in response to a user instruction received by a user selecting a selectable object of the web based GUI; and modifying the graphical object of the web based GUI when the contents of data structure is modified.

17 Claims, 5 Drawing Sheets

BACKGROUND PROCESSING IN A WEB BROWSER

BACKGROUND

Some embodiments described in the present disclosure relate to a software program's graphical user interface and, more specifically, but not exclusively, to a graphical user interface executed within a web browser.

The world wide web (WWW) is an interconnected system of public information resources, accessible through the Internet. An information resource may be organized in a page, containing text, images, video, audio or any combination thereof. A page may include references to other information resources. An information resource may be a static resource, residing on a computer network, or may be a dynamic resource that is computed when accessed. An information resource is commonly referenced by a Uniform Resource Locator (URL), which is a string containing characters that identify a location of the information resource on the computer network and a technique for retrieving the information resource, for example a network protocol such at File Transfer Protocol (FTP) and HyperText Transfer Protocol (HTTP).

Henceforth, the term web page is used to mean an information resource that is accessed through the Internet using a URL. A web page may be static, residing on a computer network, or dynamic, computed when accessed.

A web browser is a software application for retrieving web pages and displaying them to a user in one or more graphical objects. Some examples of a graphical object are a text area, a table, a graph, and an image. A graphical object may be selectable, allowing receiving input from a user, for example an editable text area, a radio button, a check box, a drop down menu and a button. An element of a table, for example a cell, a row or a column, may be a selectable object. A graphical object may be for display only. A graphical object may be modifiable by the user. It is increasingly common for a software program's graphical user interface (GUI) to be implemented using one or more web pages, known as a web based GUI.

Common web browser designs support displaying a plurality of web pages in one application window by using a plurality of tabs in the one application window, each displaying one of the plurality of web pages. However, in some implementations of a web browser each tab is executed by one thread of the web browser which, in computer science, is the smallest sequence of programmed instructions that can be managed independently by a scheduler. When a user interacts with a software program's GUI, an instruction provided by the user may trigger a computation. In a web based GUI, a user's instruction may be a result of the user selecting a selectable graphical object of the web based GUI. As a page is executed by one thread, while the thread performs the computation in response to the user's instruction the thread does not enable user interaction with other selectable graphical objects of the web based GUI. When the web base GUI is not responsive, it is said that the user experience is of a frozen GUI.

SUMMARY

It is an object of some embodiments described in the present disclosure to provide a system and a method for executing in a web browser a web based GUI of a software program. In such embodiments, one or more client instructions that are identified for background processing are executed by one or more worker threads that are not a primary thread that executes code implementing the web based GUI. It should be noted that the one or more worker threads do not execute the web based GUI. Further in such embodiments, while the one or more worker threads execute, one or more graphical objects of the web based GUI display temporary data retrieved from one or more data structures and additionally one or more other graphical objects of the web based GUI are modified in response to a user selecting one or more selectable objects of the web based GUI. Further in such embodiments, when the contents of the one or more data structures are modified, for example with one or more outcomes of executing the one or more worker threads, the one or more graphical objects are modified, optionally according to the modified contents of the one or more data structures.

The foregoing and other objects are achieved by the features of the independent claims. Further implementation forms are apparent from the dependent claims, the description and the figures.

According to a first aspect of the invention, a system for executing a software program comprises: at least one display device for displaying a web based graphical user interface (GUI) of the software program; and at least one hardware processor, connected to the at least one display device and adapted for executing in a web browser a code comprising: executing, in at least one worker thread that is not a primary thread executing code implementing the web based GUI, at least one client instruction identified in the primary thread for background processing; while the at least one worker thread executes: displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when the contents of the at least one data structure is modified. Executing the at least one client instruction in at least one worker thread allows the primary thread to respond to the at least one user instruction while the at least one worker thread executes the at least one client instruction. Using one or more data structures for the temporary data and the outcome of executing the at least one client instruction facilitates providing the user with a responsive GUI while using existing web browser display update mechanisms, reducing complexity of the web based GUI compared to implementing an ad-hoc update method to update the one or more graphical objects when the outcome of executing the at least one client instruction is available.

According to a second aspect of the invention, a method for executing a software program comprises: executing in a web browser a code comprising: executing, in at least one worker thread that is not a primary thread executing code implementing a web based GUI of the software program, at least one client instruction identified in the primary thread for background processing; while the at least one worker thread executes: displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when the contents of the at least one data structure is modified.

According to a third aspect of the invention, a web browser plugin comprising code for execution in a web browser comprises: executing, in at least one worker thread that is not a primary thread executing code implementing a web based GUI of the software program, at least one client instruction identified in the primary thread for background processing; while the at least one worker thread executes: displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when the contents of the at least one data structure is modified.

With reference to the first and second aspects, in a first possible implementation of the first and second aspects of the present invention the at least one worker thread is selected from a pool of worker threads of the web browser. Optionally, the code further comprises: executing, in one or more worker threads of the at least one worker thread at least one other client instruction identified in the primary thread for background processing, and while the one or more worker threads execute: displaying in at least one additional graphical object of the web based GUI additional data retrieved from at least one additional data structure associated with another outcome of executing the at least one other client instruction, where the at least one additional data structure contains other temporary data; and modifying at least one other additional graphical object of the web based GUI in response to at least one additional user instruction received by the user selecting at least one additional selectable object of the web based GUI; and modifying the at least one additional graphical object of the web based GUI when the contents of the at least one additional data structure is modified. Using a pool of worker threads and reusing one or more worker threads reduces latency and increases throughput when processing the at least one client instruction compared to creating one or more new threads each time background processing is needed.

With reference to the first and second aspects, in a second possible implementation of the first and second aspects of the present invention the at least one client instruction is identified in the primary thread for background processing according to at least one mark in a source code of the code implementing the web based GUI. Identifying the at least one client instruction according to one or marks in the source code increases control of a developer of the web based GUI over execution thereof, thus increasing usability of the web based GUI.

With reference to the first and second aspects, in a third possible implementation of the first and second aspects of the present invention the at least one client instruction is identified in the primary thread for background processing according to an analysis of the code implementing the web based GUI. Identifying the at least one client instruction according to an analysis of the code implementing the web based GUI increases accuracy of identifying the at least one client instructions which reduces the likelihood of the web based GUI becoming unresponsive and thus increases usability of the web based GUI. Optionally, the analysis of the code implementing the web-based comprises marking the at least one client instruction in the code. Optionally, the analysis of the code implementing the web-based comprises identifying that an estimated computing time for executing the at least one client instruction is greater than a threshold computing time. Identifying the at least one client instruction by identifying that an estimated computing time for executing the at least one client instruction is greater than a threshold computing time reduces the likelihood of the web based GUI becoming unresponsive and thus increases usability of the web based GUI.

With reference to the first and second aspects, in a fourth possible implementation of the first and second aspects of the present invention the primary thread comprises orchestration code for: providing the one or more worker threads with the at least one client instruction; updating the at least one data structure with the temporary data; receiving from the one or more worker threads at least one outcome value computed by the one or more worker threads executing the at least one client instruction; and updating the at least one data structure with the at least one outcome value. Using orchestration code for providing the one or more worker threads with the at least one client instructions and for updating the at least one data structure with the temporary data and the at least one outcome value reduces complexity of the code implementing the web base GUI compared to implementing separate initialization of the worker threads each time background processing is needed and thus reduces cost of development of the web based GUI and increases accuracy thereof. Optionally, the orchestration code is further for: adding at least one task, created according to the at least one client instruction, to at least one task queue of one or more task queues, where each of the one or more task queues has a priority; and executing the at least one client instruction in the one or more worker threads in response to selecting the at least one task from the at least one task queue according to the respective priority of the at least one task queue. Using one or more task queues where each has a priority increases accuracy of an order in which a plurality of tasks is executed and thus increases usability of the web based GUI. Optionally, the orchestration code is further for: identifying in the one or more task queues at least one pending task similar to the at least one task according to a similarity test; and removing the at least one pending task from the one or more task queues. Removing one or more pending tasks that are similar to the task created according to the at least one client instruction reduces an amount of computer resources used when executing the web based GUI compared to executing all the tasks, increasing throughput and reducing latency when executing the task. Optionally, adding the at least one task to the at least one task queue is according to a priority mark in a source code of the code implementing the web based GUI. Optionally, adding the at least one task to the at least one task queue comprises associating the at least one task with a timestamp indicative of a time of adding the at least one task to the at least one task queue. Optionally, the orchestration code is further for moving the at least one task from the at least one task queue to at least one other task queue of the one or more task queues according to the respective timestamp of the at least one task. Moving a task from a queue having one priority to a queue having another priority increases accuracy of an order in which a plurality of tasks is executed and thus increases usability of the web based GUI.

With reference to the first and second aspects, in a fifth possible implementation of the first and second aspects of the present invention at least one of the at least one graphical object is selected from a group of graphical objects consisting of: a text area, an editable text area, a table, a graph, a drop-down menu, an image, a link, a checkbox, a radio button, and a button. Optionally, at least one of the at least one other graphical object is selected from said group of graphical objects. Optionally, at least one of the at least one selectable object is selected from a group of selectable objects consisting of: a text box, a drop-down menu, a checkbox, a radio button, and a button. Optionally, the at least one graphical object is a child object of a first graphical object of the web based GUI, the at least one other graphical object is a child object of a second graphical object of the web based GUI, the first graphical object is not the second graphical object. Using graphical objects having separate parent objects of the web based GUI increases usability of the web based GUI.

With reference to the first and second aspects, in a sixth possible implementation of the first and second aspects of the present invention the at least one client instruction is executed in the at least one worker thread in response to at least one other user instruction received by the user selecting at least one other selectable object of the web based GUI. Optionally, the at least one client instruction is executed in the at least one worker thread in response to the web based GUI receiving at least one data value. Responding to another user instruction and additionally or alternatively to the web based GUI receiving one or more data values increases usability of the web based GUI.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
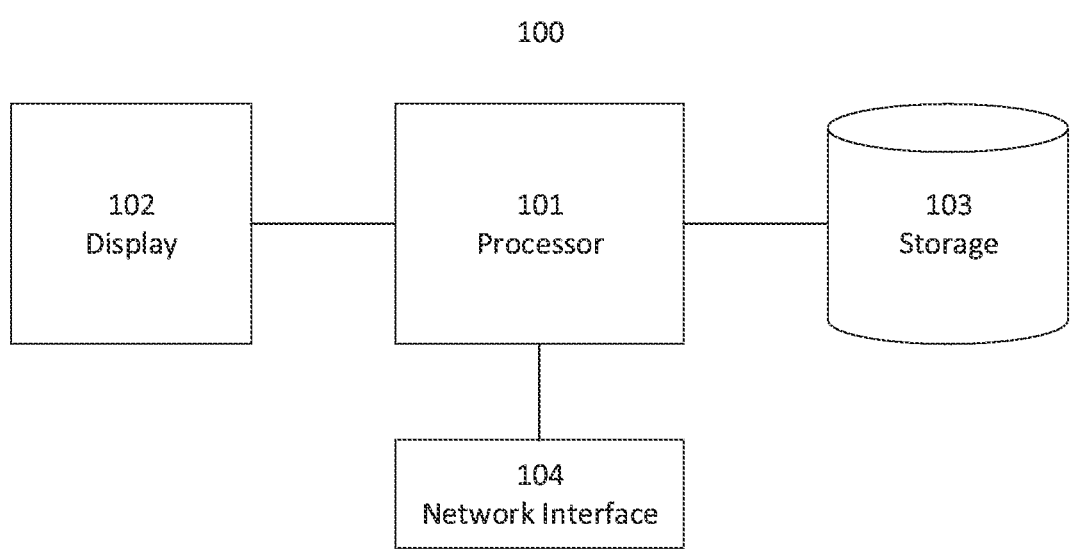
FIG. 1 is a schematic block diagram of an exemplary system, according to some embodiments.

When a software program has a web based GUI, in some implementations the web based GUI is implemented in a client-server model where the web based GUI is a client communicating with a server that implements other parts of the software program. In some implementations the client and the server are separate computers, communicating via a digital communication network, for example the Internet. According to some programming paradigms most of the software program's program data resides on the server, and any computation that requires the program data is performed by the server, with some outcome values computed in such a computation sent to the web based GUI to display to the user. However, there is an increase in the use of other programming paradigms where a significant amount of the program data resides on the client executing the web based GUI. In systems where a significant amount of the program data resides on the client, some functionality of the software program is implemented in the code that implements the web based GUI and is executed by the web browser on the client. In some implementations the functionality that is implemented in the code that is executed by the web browser on the client uses part of the program data that resides on the client. There exists a guideline recommending that execution time of a local computation in a web page by a web browser does not exceed 16 milliseconds. As the amount of program data increases, the amount of time required for computation by the web browser increases. Executing such functionality of the software program in the web browser increases the likelihood of the web based GUI becoming unresponsive.

An unresponsive GUI reduces usability of a web based GUI as the user cannot interact with the web based GUI while it is not responsive. There is a need to reduce the likelihood of a web based GUI becoming unresponsive while the user interacts with it.

In some web browser implementations, the web browser displays a web page using one or more data structures that hold web page data and refreshes the display of the web page according to the web page data. The web browser may update the web page periodically, and additionally or alternatively when the web page data in the one or more data structures is updated.

Some GUIs that are not web based use multiple threads to separate GUI implementation from other computations, allowing the GUI to remain responsive to user interaction while other threads execute the other computations and update data structures used by the GUI. Some programming languages used for implementing web based GUI support spawning of additional threads for background processing, for example the Web Workers API as defined by the World Wide Web Consortium (W3C) and the Web Hypertext Application Technology Working Group (WHATWG). However, such additional threads do not have access to data structures used by the thread executing the web based GUI and require a developer using such additional threads to implement a messaging mechanism each time such additional threads are used.

To increase usability of the web based GUI, the present disclosure proposes in some embodiments described herewithin responding to one or more user instructions, received by a user selecting one or more selectable objects of the web-based GUI, while executing one or more client instructions identified for background processing. To do so, the present disclosure proposes in such embodiments executing the one or more client instructions in one or more worker threads that are not a primary thread that executes code that implements the web based GUI in the web browser. In such embodiments, one or more data structures are associated with an outcome of executing the one or more client instructions, and while the one or more worker threads execute the one or more client instructions, data retrieved from the one or more data structures is displayed in one or more graphical objects of the web based GUI and one or more other graphical objects are modified in response to the one or more user instructions. Optionally, the one or more data structures contain temporary data. Optionally, when the contents of the one or more data structures are modified, the one or more graphical objects of the web based GUI are modified, for example when the contents of the one or more data structures is modified with one or more outcome values of executing the one or more worker threads. Executing the one or more client instructions in one or more worker threads allows the primary thread to respond to the one or more user instructions while the one or more worker threads execute the one or more client instructions. Modifying the one or more graphical objects of the web based GUI in response to the one or more user instructions while the one or more worker threads execute the one or more client instructions reduces the likelihood of a user experiencing an unresponsive GUI and thus increases usability of the web based GUI. Displaying temporary data while the one or more worker threads execute provides the user with a user experience similar to a user experience when the outcome of executing the one or more client instructions is available, further increasing usability of the web based GUI. Using the one or more data structures for the temporary data and the outcome of executing the one or more client instructions facilitates using existing web browser display update mechanisms, reducing complexity of the web based GUI compared to implementing an ad-hoc update method to update the one or more graphical objects when the outcome of executing the one or more client instructions is available.

Optionally, the one or more graphical objects for displaying the outcome of executing the one or more client instructions and the one or more other graphical objects modified while the one or more worker threads execute do not share a parent object of the web based GUI. For example, a first parent of the one or more graphical objects may be a first HyperText Markup Language (HTML) element, for example a window, and iframe of a window, a body element or a portal element. Optionally, a second parent of the one or more other graphical objects may be a second HTML element, for example another window or another iframe of a window.

Optionally, the one or more client instructions are identified in the primary thread for background processing according to one or more marks in a source code of the code implementing the web based GUI. For example, a developer of the source code my use an identified instruction to mark the one or more client instructions. Optionally, the identified instruction delimits a beginning and additionally or alternatively an end of the one or more client instructions. Optionally, the one or more marks comprise an identified label in the source code, optionally delimiting a beginning and additionally or alternatively an end of the one or more client instructions. Optionally, the one or more marks are added according to an analysis of the code implementing the web based GUI. Optionally, the analysis comprises adding the one or more marks, for example by at least one analysis software object executing the analysis. The analysis may be of the source code. Optionally, the analysis is of runtime code of the code implementing the web based GUI. For example, the analysis may identify that execution time of the one or more client instructions is greater than a threshold computing time. For example, the threshold computing time may be 16 milliseconds. Other examples of a threshold computing time include, but are not limited to, 100 microseconds, 300 microseconds, 2 milliseconds, 5 milliseconds, 10 milliseconds, 30 milliseconds and 100 milliseconds. Optionally, the threshold computing time is greater than 100 milliseconds.

In addition, in some embodiments described herewithin, the primary thread executing the code implementing the web based GUI comprises orchestration code. Optionally, the orchestration code is for providing the one or more worker threads with the one or more client instructions. Optionally, the orchestration code updates the one or more data structures with the temporary data. Optionally, the orchestration code receives from the one or more worker threads one or more outcome values computed by the one or more worker threads executing the one or more client instructions. Optionally, the orchestration code updates the one or more data structures with the one or more outcome values.

Optionally, the orchestration code manages more than one task for executing background instructions. Optionally, the orchestration creates one or more tasks according to the one or more client instructions identified for background processing. Optionally, the orchestration code manages one or more task queues for executing background instructions, where each of the task queues has a priority. Optionally, the orchestration code adds the one or more tasks created according to the one or more client instructions to at least one of the one or more task queues. Optionally, the orchestration code adds the one or more tasks to the at least one task queue according to the respective priority of the at least one task queue, for example when there is a priority mark in the source code of the code implementing the web base GUI. Optionally, the orchestration code selects at least one task from the one or more task queues for execution by the one or more worker threads, optionally according to the respective priority of the one or more task queues. For example, to execute the one or more client instructions, the orchestration code may execute the one or more client instructions in the one or more worker threads in response to selecting the one or more tasks created according to the respective priority of the at least one task queue.

Optionally, the orchestration code identifies in the one or more task queues one or more pending tasks similar to the one or more tasks created according to the one or more client instructions identified for background processing and removes the one or more pending tasks from the one or more task queues. The orchestration code may identify the similarity according to one or more similarity tests, for example according to an operation of a task or an origin object in the web based GUI of the one or more client instructions. Optionally, the orchestration code removes from the one or more task queues older tasks that are similar to a newer task, for example, when a task of the one or more tasks and the one or more pending tasks have a common operation and different data. Optionally, the orchestration code moves a task from one of the one or more tasks queue to another of the one or more task queues, for example moving a task from a low priority task queue to a high priority task queue after an identified amount of time elapses since adding the task to the low priority task queue.

Managing one or more task queues, each associated with a priority, and creating one or more tasks according to the one or more client instructions allows mitigating redundant computations by identifying out of date similar tasks, reducing an amount of computation resources used when executing the software program and reducing the latency for updating the one or more graphical objects of the web based GUI. In addition, managing the one or more task queues where each is associated with a priority allows controlling the order in which tasks are executed. Reducing the latency for updating the one or more graphical objects and controlling the order in which tasks are executed improves usability of the web based GUI.

Optionally, the one or more worker threads are selected from a pool of worker threads. Optionally, the pool of worker threads are native threads of the web browser. Optionally, the pool of worker threads are created by the primary thread. Optionally, the pool of worker threads are created by the orchestration code. Optionally, the pool of worker threads are created by plugin code that is added to the web browser and is not part of the software program's web based GUI. Optionally, at least some of the one or more worker threads are reused to execute one or more other client instructions marked for background processing. Reusing a pool of worker threads to execute more than one set of background instructions reduces an amount of computer resources used when executing the web based GUI.

In addition, in some embodiments described herewithin one or more of the methods described in this disclosure are implemented in a web browser plugin.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Certain embodiments disclosed herein include devices, systems, and methods for collaborative work systems that may allow a user to interact with information in real time, for example via a web based GUI. The platform may allow a user to structure the system in many ways with the same building blocks to represent what the user wants to manage and how the user wants to manage it. This may be accomplished through the use of boards. A board may be a table with items (e.g., individual items presented in horizontal rows in a web base GUI) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table in a GUI, for example a web based GUI. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented in a GUI, for example a web based GUI, horizontally and a column vertically. However, in the broader generic sense as used herein, the term "row" may refer to one or more of a horizontal and a vertical presentation, optionally in a web based GUI. A table or tablature as used herein, refers to data presented in a GUI, for example a web based GUI, in horizontal and vertical rows, (e.g., horizontal rows and vertical columns) defining cells in which data is presented. While a table view may be one way to present and manage the data contained on a board, a table's or board's data may be presented in different ways. For example, in some embodiments, dashboards may be utilized to present or summarize data derived from one or more boards. A dashboard may be a non-table form of presenting data using for example static or dynamic graphical representations in a GUI, for example a web base GUI. A dashboard may also include multiple non-table forms of presenting data. Such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Reference is now made to FIG. 1, showing a schematic block diagram of an exemplary system 100, according to some embodiments. In such embodiments, at least one processor 101 is connected to one or more display devices 102. Some examples of a display device are a monitor, a computer screen and a smartphone screen. When at least one processor 101 executes a web based GUI of a software program in a web browser, at least one processor 101 optionally displays the web based GUI on one or more display devices 102.

For brevity, henceforth the term "processing unit" is used to mean "at least one hardware processor" and the terms are used interchangeably.

Optionally, processing unit 101 is connected to one or more digital storage devices 103, optionally storing program data of the software program. Optionally, one or more digital storage devices 103 comprise at least one non-volatile digital storage device. Some examples of a non-volatile digital storage device are a disk drive, a solid state drive, a network connected storage and a storage network. Optionally, processing unit 101 is connected to at least one digital communication network interface 104, optionally for the process of communicating with a server executing at least part of the software program. Optionally, at least one digital communication network interface 104 is connected to a local area network (LAN), for example an Ethernet network or a Wi-Fi network. Optionally, at least one digital communication network interface 104 is connected to a wide area network (WAN), for example the Internet or a cellular network, for example a Global System for Mobile Communications (GSM) network.

Figure 2:
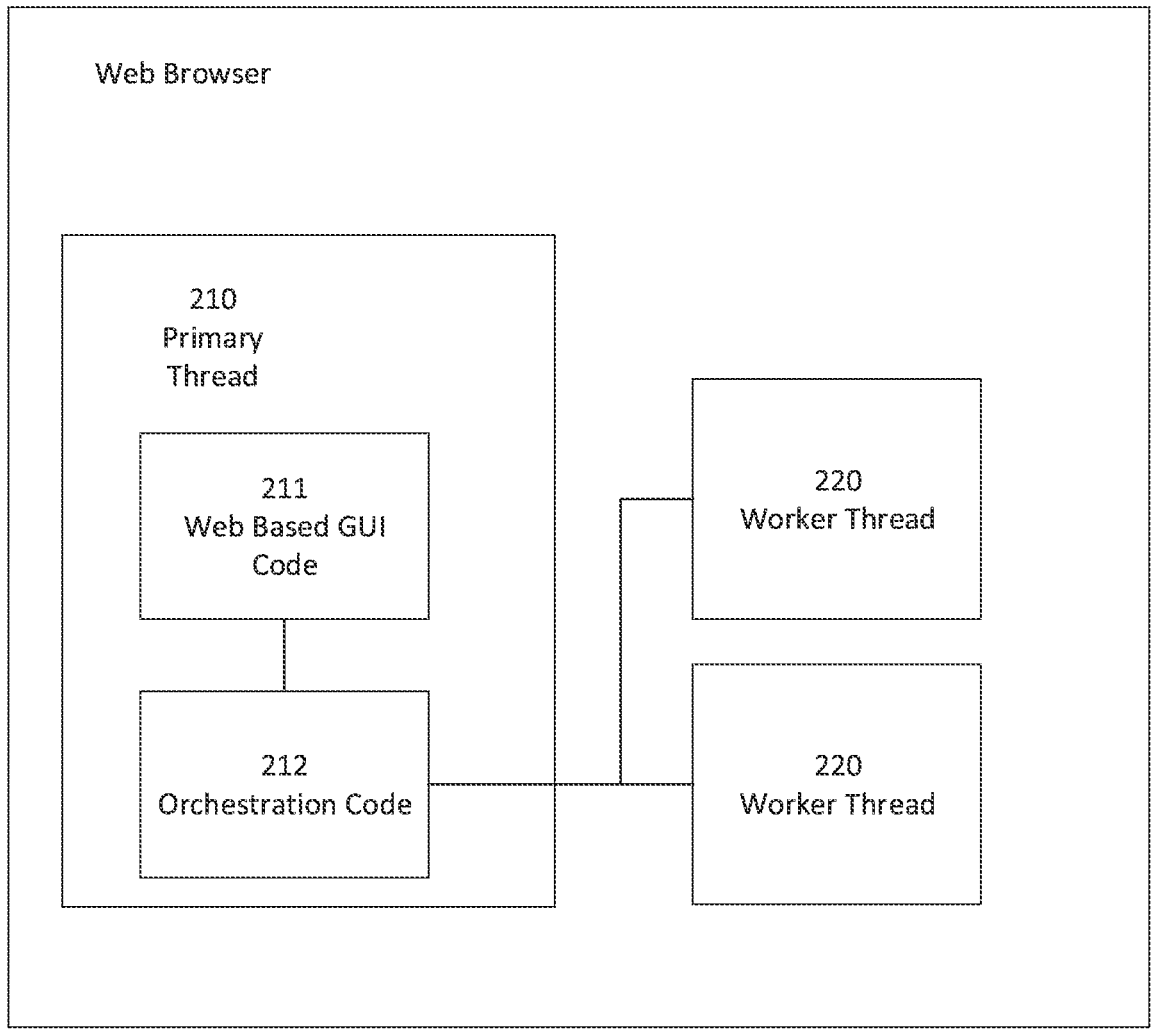
FIG. 2 is a schematic block diagram of an exemplary web browser, according to some embodiments.

In some embodiments, processing unit executes a web browser. Reference is now made also to FIG. 2, showing a schematic block diagram of an exemplary web browser 200, according to some embodiments. In such embodiments, web browser 200 comprises a primary thread 210. Optionally, primary thread 210 comprises code 211 implementing a web based GUI of a software program (web based GUI code 211), executed by processing unit 101. Some examples of a software program having a web based GUI include a shopping application, a system management application and a system monitoring application. In the field of software programs, a dashboard is a GUI that visualizes data to help users understand the analytics and metrics of a business or a system (or both). Optionally, the web based GUI comprises one or more dashboards, for example to display at least part of a status of a monitored system or of a managed system.

Optionally, web browser 200 comprises one or more worker threads 200, optionally for executing one or more client instructions of the web based GUI code 211. Optionally, primary thread 210 communicates with one or more worker threads 220. Optionally, one or more worker threads 220 are members of a pool of worker threads of web browser 200. Optionally, one or more worker threads 200 are created by the primary thread 210. Optionally, one or more worker threads 220 are created by plugin code of the web browser that is not part of the web based GUI code 210.

Optionally, the primary thread 210 comprises orchestration code 212. Optionally, one or more worker threads 220 are created by orchestration code 212. Optionally, orchestration code 212 manages one or more worker threads 220. Optionally, orchestration code 212 comprises and manages one or more task queues, for the purpose of managing one or more worker threads 220.

In some embodiments, to execute a software program system 100 implements the following optional method.

Figure 3:
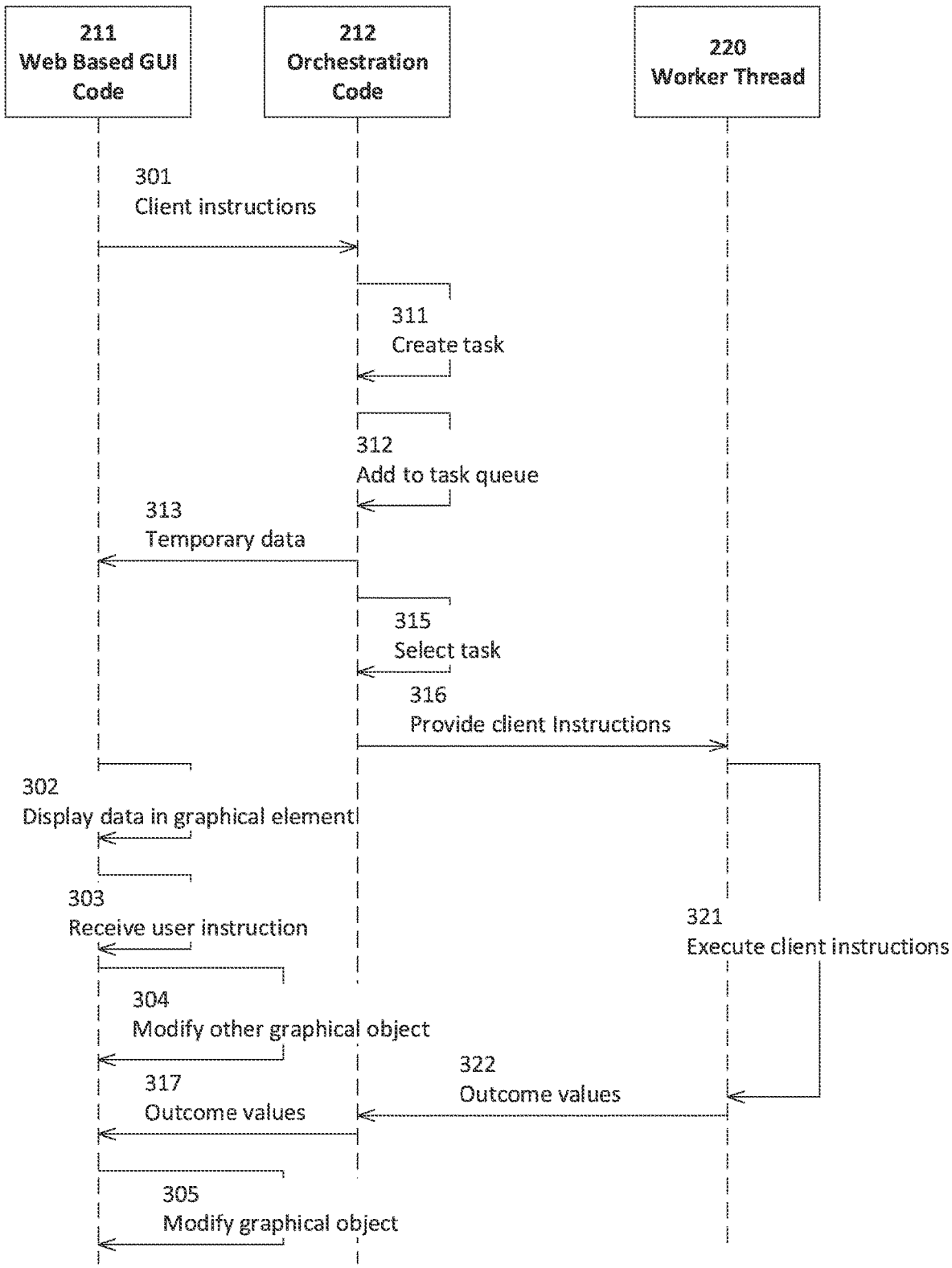
FIG. 3 is a sequence diagram of an optional flow of operations, according to some embodiments.

Reference is now made also to FIG. 3, showing a sequence diagram of an optional flow of operations 300, according to some embodiments. In such embodiments, in 321 processing unit 101 executes in one or more worker threads 220 one or more client instructions identified in the primary thread 210 for background processing.

Figure 4:
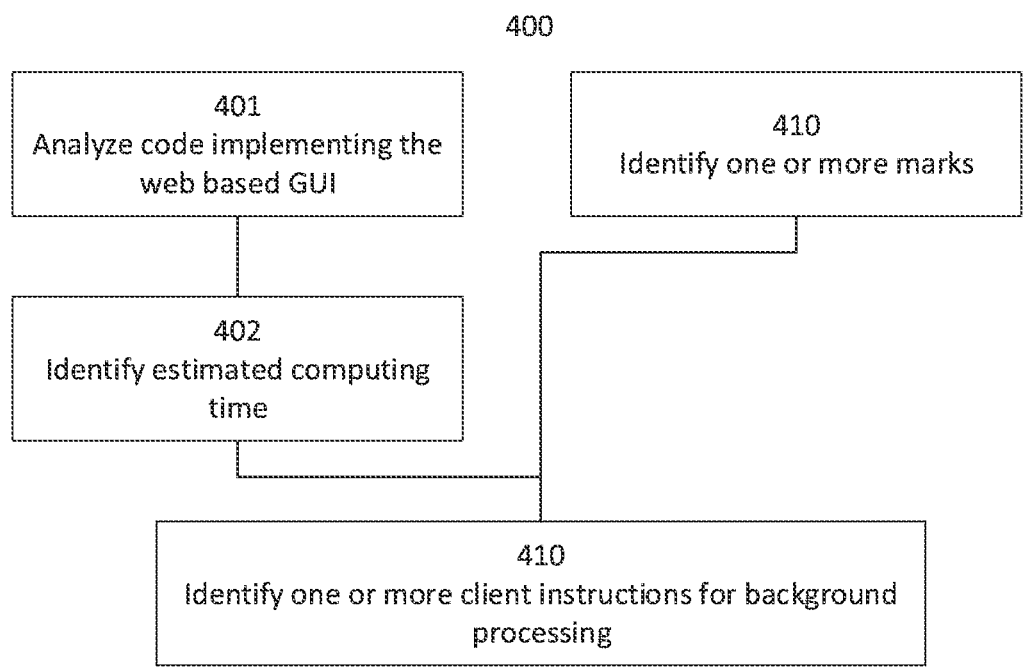
FIG. 4 is a flowchart schematically representing an optional flow of operations for identifying one or more client instructions for background processing, according to some embodiments.

Reference is now made also to FIG. 4, showing a flowchart schematically representing an optional flow of operations 400 for identifying one or more client instructions for background processing, according to some embodiments. In such embodiments, in 410 processing unit 101 optionally identifies one or more marks in a source code of web based GUI code 211. Optionally, the one or more marks include an identified instruction. Optionally, the one or more marks include an identified label. Optionally, the one or more marks delimit a start and additionally or alternatively an end of the one or more client instructions. Optionally, the one or more marks include a priority mark. Optionally, in 420 processing unit 101 identifies the one or more client instructions for background processing according to the one or more marks identified in 410.

Optionally, in 401 processing unit 101 analyzes web based GUI code 211. Optionally, analyzing web base GUI code 211 in 401 comprises processing unit 101 identifying in 402 that an estimated computing time for executing the one or more client instructions is greater than a threshold computing time. Some examples of one or more client instructions that have an estimated computing time that is greater than a threshold computing time include nested loops, object creation and access to a digital communication network. Optionally, in 402 processing unit 101 identifies a plurality of nested loos in the web based GUI code 211. Optionally, in 402 processing unit 101 identifies the web based GUI code 211 creation of one or more objects. Optionally, in 402 processing unit 101 identified in the web based GUI code 211 access to at least one digital communication network interface 104. Some examples of a threshold computing time include 100 microseconds, 300 microseconds, 2 milliseconds, 5 milliseconds, 10 milliseconds, 16 milliseconds, 30 milliseconds and 100 milliseconds. Some examples of Optionally, the threshold computing time is greater than 100 milliseconds.

Optionally, in 420 processing unit 101 identifies the one or more client instructions for background processing according to the analysis of web based GUI code 211. Optionally, web based GUI code 211 is analyzed in before loading web based GUI code 211 in web browser 200, optionally by another processing unit. Optionally, analyzing web base GUI code 211 comprises providing the web base GUI code 211 to at least one static code analyzer. Optionally, analyzing web based GUI code 211 comprises marking the one or more client instructions in web based GUI code 211.

Optionally, processing unit 101 identifies the one or more client instructions for background processing in the primary thread 210 when a web page comprising web based GUI code 211 is loaded in web browser 200. Optionally, processing unit 101 identifies the one or more client instructions in the primary thread 210 in response to a user selecting at least one selectable object of web base GUI code 211. Some examples of a selectable object include a text box, an editable text box, a drop-down menu, a checkbox, a radio button, and a button.

Reference is now made again to FIG. 3.

While one or more worker threads 220 execute, in 302 processing unit 101 optionally displays in one or more graphical objects of web base GUI code 211 data retrieved from one or more data structures associated with an outcome of executing the one or more client instructions. Optionally, the one or more data structures contain temporary data. Some examples of a graphical object include a text area, an editable text area, a table, a graph, a drop-down menu, an image, a link, a checkbox, a radio button and a button. Some other examples of a graphical object are an element of a table, for example a cell, a row and a column.

Optionally, while one or more worker threads 220 execute, in 303 processing unit 101 receives one or more user instructions. Optionally, the one or more user instructions are received by a user selecting one or more selectable objects of the web based GUI code 211. Optionally, in response to receiving the one or more user instructions, in 304 processing unit 101 modifies one or more other graphical objects of web based GUI code 211. For example, processing unit 101 may change data displayed in the one or more other graphical objects. Other examples of a modification to a graphical object include a hover effect, changing a color of the graphical object, changing an image displayed in the graphical object, changing a shape of the graphical object, and changing a size of the graphical object.

Optionally, in 322 one or more worker threads 220 provide to the primary thread 210 one or more outcome values computed when executing the one or more client instructions. Optionally, one or more worker threads 220 provide the one or more outcome values to orchestration code 212 of the primary thread 210 such that the orchestration code 212 receives the one or more outcome values from the one or more worker threads 220. In 317, orchestration code 211 optionally updates the one or more data structures with the one or more outcome values, optionally modifying the contents of the one or more data structures using the one or more outcome values. Optionally, in 305 processing unit 101 modifies the one or more graphical objects when the contents of the one or more data structures are modified.

Optionally, 322 and 317 are repeated, such that the contents of the one or more data structures are updated with an outcome of executing the one or more client instructions incrementally. Optionally, processing unit 101 executes 305 more than once, incrementally modifying the one or more graphical objects according to an incremental modification of the contents of the one or more data structures such that at some time the one or more graphical objects display a mixture of some of the temporary data and some of the one or more outcome values of executing the one or more client instructions.

Optionally, in 301 orchestration code 211 receives the one or more client instructions from web based GUI code 211. Optionally, in 313, orchestration code 211 updates the one or more data structures with the temporary data.

In some embodiments, orchestration code 212 implements one or more task queues, optionally for managing one or more worker threads 220. Optionally, each of the one or more task queues has a priority.

Optionally, in 311, processing unit 101 executes orchestration code 212 for creating one or more tasks according to the one or more client instructions. Optionally, in 312, processing unit 101 executes orchestration code 212 for adding the one of more tasks to at least one task queue of the one or more task queues.

Figure 5:
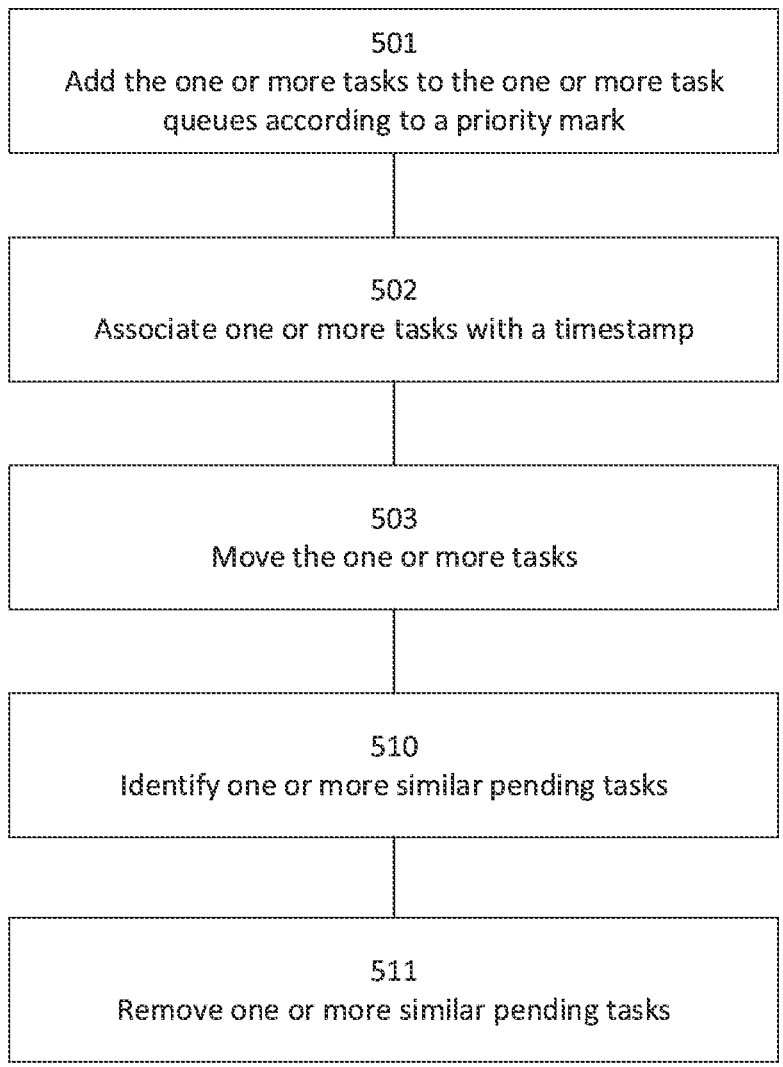
FIG. 5 is a flowchart schematically representing an optional flow of operations for managing one or more task queues, according to some embodiments.

Reference is now made also to FIG. 5, showing a flowchart schematically representing an optional flow of operations 500 for managing one or more task queues, according to some embodiments. Optionally, in 501 processing unit 101 adds the one or more tasks to the at least one task queues according to the priority mark in the source code of the web based GUI code 211. Optionally, in 502 processing unit 101 associates the one or more tasks with a timestamp indicative of a time of adding the one or more tasks to the at least one task queue.

Reference is now made again to FIG. 3. In 315, processing unit 101 optionally executes orchestration code 212 for selecting the one or more tasks according to the respective priority of the at least one task queue, and in response to selecting the one or more tasks in 316 processing unit 101 optionally executes orchestration code 212 for providing the one or more client instructions to the one or more worker threads 220 and for executing the one or more client instructions in the one or more worker threads.

Optionally, the one or more client instructions are executed in the one or more worker threads 220 in response to one or more other user instructions received by the user selecting one or more other selectable objects of the web based GUI 212. For example, when a user modifies a filter of a dashboard. Optionally, the one or more client instructions are executed in the one or more worker threads in response to the web based GUI code 212 executed by processing unit 101 receiving one or more data values, for example when program data of the software program is updated in the background and not by a user interacting with the GUI. In such an example, a data filter of the web based GUI 211 may be reapplied using one or more worker threads 220.

Optionally, processing unit 101 executes method 300 more than once, optionally using at least some of one or more worker threads 220 to execute one or more other client instructions identified in the primary thread 210 for background processing. Optionally, while the at least some worker threads execute, processing unit 101 displays in one or more additional graphical objects of the web based GUI code 211 additional data retrieved from one or more additional data structures associated with another outcome of executing the one or more other client instructions. Optionally the one or more additional data structures contain other temporary data. Optionally, while the at least some worker threads execute, processing unit 101 modifies one or more other additional graphical objects of the web based GUI 211 in response to one or more additional user instructions received by the user selecting one or more additional selectable objects of the web based GUI 212. Optionally, processing unit 101 modifies the one or more additional graphical objects of the web based GUI 212 when the contents of the one or more additional data structures is modified. Optionally, the one or more other client instructions are the one or more client instructions, i.e. the one or more tasks are executed again. Optionally, the one or more additional graphical objects are the one or more graphical objects, i.e. the one or more graphical objects are modified again.

Optionally, one worker thread of the pool of worker threads manages the pool of worker threads and delegates the one or more client instructions to the one or more worker threads 220.

In some embodiments, processing unit 101 further executes orchestration code 212 to manage a plurality of tasks queued in the one or more task queues.

Reference is now made again to FIG. 5. Optionally, in 503 processing unit 101 executes orchestration code 212 for moving the one or more tasks from the at least one task queue to at least one other task queue of the one or more task queues according to the respective timestamp of the one or more tasks, for example to move the one or more tasks from a low priority task queue to a higher priority task queue after an amount of time that elapsed from the respective timestamp of the one or more tasks exceeds a time threshold. Some examples of a time threshold for moving a task from one task queue to another task queue include 300 microseconds, 500 microseconds, 1 millisecond, 10 milliseconds, 17 milliseconds, 50 milliseconds, 73 milliseconds and 100 milliseconds.

Optionally, in 510 processing unit 101 executes orchestration code 212 for identifying in the one or more task queues one or more pending tasks that are similar to the one or more tasks according to a similarity test. For example, the one or more pending tasks may be similar to the one or more tasks when the one or more pending tasks and the one or more tasks have a common operation. Optionally, tasks are similar when the tasks have a common origin object in the web based GUI code, for example when the tasks are created for common client instructions. Optionally, in 511 processing unit 101 executes orchestration code 212 for removing the one or more pending tasks from the one or more task queues.

In some embodiments, a web browser plugin implements at least part of method 300. Optionally, system 100 executes the web browser plugin that implements at least part of method 300. For example, orchestration code 212 may be implemented in the web browser plugin.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant graphical objects and client instructions will be developed and the scope of the terms "graphical object" and "client instruction" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments.

Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for executing a software program comprising:
   at least one display device for displaying a web based graphical user interface (GUI) of the software program; and
   at least one hardware processor, connected to the at least one display device and adapted for executing in a web browser a code comprising:
   executing, in at least one worker thread that is not a primary thread executing code implementing the web based GUI, at least one client instruction identified in the primary thread for background processing;
   while the at least one worker thread executes:
   displaying in at least one graphical object of the web based GUI data retrieved from at least one data structure associated with an outcome of executing the at least one client instruction, where the at least one data structure contains temporary data; and
   modifying at least one other graphical object of the web based GUI in response to at least one user instruction received by a user selecting at least one selectable object of the web based GUI; and
   modifying the at least one graphical object of the web based GUI when a content of the at least one data structure is modified;
   wherein the at least one client instruction is identified in the primary thread for background processing according to at least one mark in a source code of the code implementing the web based GUI.

2. The system of claim 1, wherein the at least one worker thread is selected from a pool of worker threads of the web browser.

3. The system of claim 1, wherein the code further comprises:
   executing, in one or more worker threads of the at least one worker thread at least one other client instruction identified in the primary thread for background processing;
   while the one or more worker threads execute:
   displaying in at least one additional graphical object of the web based GUI additional data retrieved from at least one additional data structure associated with another outcome of executing the at least one other client instruction, where the at least one additional data structure contains other temporary data; and
   modifying at least one other additional graphical object of the web based GUI in response to at least one additional user instruction received by the user selecting at least one additional selectable object of the web based GUI; and modifying the at least one additional graphical object of the web based GUI when a content of the at least one additional data structure is modified.

4. The system of claim 1, wherein the at least one graphical object is a child object of a first graphical object of the web based GUI;

wherein the at least one other graphical object is a child object of a second graphical object of the web based GUI; and wherein the first graphical object is not the second graphical object.

5. A system for executing a software program comprising:

at least one display device for displaying a web based graphical user interface (GUI) of the software program; and at least one hardware processor, connected to the at least one display device and adapted for executing in a web browser a code comprising:

executing, in at least one worker thread that is not a primary thread executing code implementing the web based GUI, at least one client instruction identified in the primary thread for background processing;

while the at least one worker thread executes:

displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when a content of the at least one data structure is modified;

wherein the at least one client instruction is identified in the primary thread for background processing according to an analysis of the code implementing the web based GUI.

6. The system of claim 5, wherein the analysis of the code implementing the web-based comprises marking the at least one client instruction in the code.

7. The system of claim 5, wherein the analysis of the code implementing the web-based comprises identifying that an estimated computing time for executing the at least one client instruction is greater than a threshold computing time.

8. A system for executing a software program comprising:

at least one display device for displaying a web based graphical user interface (GUI) of the software program; and at least one hardware processor, connected to the at least one display device and adapted for executing in a web browser a code comprising:

executing, in at least one worker thread that is not a primary thread executing code implementing the web based GUI, at least one client instruction identified in the primary thread for background processing;

while the at least one worker thread executes:

displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when a content of the at least one data structure is modified;

wherein the primary thread comprises orchestration code for:

providing the one or more worker threads with the at least one client instruction;

updating the at least one data structure with the temporary data;

receiving from the one or more worker threads at least one outcome value computed by the one or more worker threads executing the at least one client instruction; and updating the at least one data structure with the at least one outcome value.

9. The system of claim 8, wherein the orchestration code is further for:

adding at least one task, created according to the at least one client instruction, to at least one task queue of one or more task queues, where each of the one or more task queues has a priority; and executing the at least one client instruction in the one or more worker threads in response to selecting the at least one task from the at least one task queue according to the respective priority of the at least one task queue.

10. The system of claim 9, wherein the orchestration code is further for:

identifying in the one or more task queues at least one pending task similar to the at least one task according to a similarity test; and removing the at least one pending task from the one or more task queues.

11. The system of claim 9, wherein adding the at least one task to the at least one task queue is according to a priority mark in a source code of the code implementing the web based GUI.

12. The system of claim 9, wherein adding the at least one task to the at least one task queue comprises associating the at least one task with a timestamp indicative of a time of adding the at least one task to the at least one task queue; and wherein the orchestration code is further for moving the at least one task from the at least one task queue to at least one other task queue of the one or more task queues according to the respective timestamp of the at least one task.

13. A system for executing a software program comprising:

at least one display device for displaying a web based graphical user interface (GUI) of the software program; and at least one hardware processor, connected to the at least one display device and adapted for executing in a web browser a code comprising:

executing, in at least one worker thread that is not a primary thread executing code implementing the web based GUI, at least one client instruction identified in the primary thread for background processing;

while the at least one worker thread executes:

displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when a content of the at least one data structure is modified;

wherein at least one of the at least one graphical object is selected from a group of graphical objects consisting of: a text area, an editable text area, a table, an element of a table, a graph, a drop-down menu, an image, a link, a checkbox, a radio button, and a button; and wherein at least one of the at least one other graphical object is selected from said group of graphical objects.

14. A system for executing a software program comprising:

at least one display device for displaying a web based graphical user interface (GUI) of the software program; and at least one hardware processor, connected to the at least one display device and adapted for executing in a web browser a code comprising:

executing, in at least one worker thread that is not a primary thread executing code implementing the web based GUI, at least one client instruction identified in the primary thread for background processing;

while the at least one worker thread executes:

displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when a content of the at least one data structure is modified;

wherein at least one of the at least one selectable object is selected from a group of selectable objects consisting of: a text box, an element of a table, a drop-down menu, a checkbox, a radio button, and a button.

15. A system for executing a software program comprising:

at least one display device for displaying a web based graphical user interface (GUI) of the software program; and at least one hardware processor, connected to the at least one display device and adapted for executing in a web browser a code comprising:

executing, in at least one worker thread that is not a primary thread executing code implementing the web based GUI, at least one client instruction identified in the primary thread for background processing;

while the at least one worker thread executes:

displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when a content of the at least one data structure is modified;

wherein the at least one client instruction is executed in the at least one worker thread in response to at least one other user instruction received by the user selecting at least one other selectable object of the web based GUI.

16. A system for executing a software program comprising:

at least one display device for displaying a web based graphical user interface (GUI) of the software program; and at least one hardware processor, connected to the at least one display device and adapted for executing in a web browser a code comprising:

executing, in at least one worker thread that is not a primary thread executing code implementing the web based GUI, at least one client instruction identified in the primary thread for background processing;

while the at least one worker thread executes:

displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when a content of the at least one data structure is modified;

wherein the at least one client instruction is executed in the at least one worker thread in response to the web based GUI receiving at least one data value.

17. A method for executing a software program comprising:

executing in a web browser a code comprising:

executing, in at least one worker thread that is not a primary thread executing code implementing a web based GUI of the software program, at least one client instruction identified in the primary thread for background processing;

while the at least one worker thread executes:

displaying in at least one graphical object of the web based GUI data retrieved from at least one data structure associated with an outcome of executing the at least one client instruction, where the at least one data structure contains temporary data; and modifying at least one other graphical object of the web based GUI in response to at least one user instruction received by a user selecting at least one selectable object of the web based GUI; and modifying the at least one graphical object of the web based GUI when a content of the at least one data structure is modified;

wherein the at least one client instruction is identified in the primary thread for background processing according to at least one mark in a source code of the code implementing the web based GUI.

* * * * *